United States Patent [19]

Margolin

[11] Patent Number: 5,566,073
[45] Date of Patent: Oct. 15, 1996

[54] PILOT AID USING A SYNTHETIC ENVIRONMENT

[76] Inventor: Jed Margolin, 3570 Pleasant Echo Dr., San Jose, Calif. 95148-1916

[21] Appl. No.: 513,298

[22] Filed: Aug. 9, 1995

Related U.S. Application Data

[63] Continuation of Ser. No. 274,394, Jul. 11, 1994, abandoned.

[51] Int. Cl.⁶ .............................. G06F 3/14; G09B 9/30
[52] U.S. Cl. .................... 364/449; 364/456; 364/457; 340/990; 340/995; 395/127; 395/129
[58] Field of Search ....................... 364/449, 455, 364/456, 457, 460; 340/990, 995; 345/7, 11, 23, 27; 395/119, 124, 125, 127, 129

[56] References Cited

U.S. PATENT DOCUMENTS

| | | | |
|---|---|---|---|
| 4,028,725 | 6/1977 | Lewis | 340/980 |
| 4,213,252 | 7/1980 | Sullivan et al. | 395/125 |
| 4,445,118 | 4/1984 | Taylor et al. | 342/357 |
| 4,468,793 | 8/1984 | Johnson et al. | 375/97 |
| 4,485,383 | 11/1984 | Maher | 342/352 |
| 4,599,620 | 7/1986 | Evans | 342/357 |
| 4,660,157 | 4/1987 | Beckwith et al. | 395/101 |
| 4,715,005 | 12/1987 | Heart | 395/125 |
| 4,910,674 | 3/1990 | Lerche | 364/443 |
| 4,954,837 | 9/1990 | Baird | 364/449 |
| 5,005,148 | 4/1991 | Behensky et al. | 364/578 |
| 5,072,396 | 12/1991 | Fitzpatrick et al. | 364/450 |
| 5,101,356 | 3/1992 | Timothy et al. | 364/449 |
| 5,140,532 | 8/1992 | Beckwith et al. | 395/101 |
| 5,153,836 | 10/1992 | Fraughton et al. | 364/461 |
| 5,179,638 | 1/1993 | Dawson et al. | 395/125 |
| 5,185,610 | 2/1993 | Ward et al. | 342/357 |
| 5,192,208 | 3/1993 | Ferguson et al. | 342/169 |
| 5,208,590 | 5/1993 | Pitts | 340/973 |
| 5,296,854 | 3/1994 | Hamilton et al. | 340/980 |
| 5,302,964 | 4/1994 | Lewins | 345/7 |
| 5,317,689 | 5/1994 | Nack et al. | 395/163 |
| 5,334,991 | 8/1994 | Wells et al. | 340/705 |

OTHER PUBLICATIONS

John Gallant, EDN magazine; Jan. 7, 1993; pp. 31–42 "System revolutionizes surveying and navigation".

Bill Clarke; Aviator's Guide to GPS; 1994; pp. 2 and 3 "GPS Program History".

Magellan Systems Corp, 960 Overland Ct, San Dimas, CA 91773 Sales brochure for GPS receiver with moving map display (MAP 7000), Jan. 1994.

Trimble Navigation; 2105 Donley Dr, Austin TX 78758 Sales brochure for Airborne GPS receiver (TNL–1000) (no date is available).

Jeppesen Sanderson, Inc; 55 Inverness Drive East, Englewood, CO 80112 Sales brochure for navigation data base in computer readable form.

U.S. Geological Service, Earth Science Information Center, Menlo Park, CA Sales brochure for Digital Elevation Model data, Jun. 1993.

(List continued on next page.)

Primary Examiner—Kevin J. Teska
Assistant Examiner—Tan Nguyen
Attorney, Agent, or Firm—Blakely, Sokoloff, Taylor & Zafman

[57] ABSTRACT

A pilot aid using synthetic reality consists of a way to determine the aircraft's position and attitude such as by the global positioning system (GPS), a digital data base containing three-dimensional polygon data for terrain and man-made structures, a computer, and a display. The computer uses the aircraft's position and attitude to look up the terrain and manmade structure data in the data base and by using standard computer graphics methods creates a projected three-dimensional scene on a cockpit display. This presents the pilot with a synthesized view of the world regardless of the actual visibility. A second embodiment uses a head-mounted display with a head position sensor to provide the pilot with a synthesized view of the world that responds to where he or she is looking and which is not blocked by the cockpit or other aircraft structures. A third embodiment allows the pilot to preview the route ahead or to replay previous flights.

37 Claims, 13 Drawing Sheets

OTHER PUBLICATIONS

U.S. Geological Service, Earth Science Information Center, Menlo Park, CA Sales brochure for Digital Line Graph data, Jun. 1993.

U.S. Department of Commerce, National Oceanic and Atmospheric Administration, Washington Aeronautical Chart (paper map).

Atari Games Corp, 675 Sycamore Dr, Milpitas, CA 95035; Sales brochure for coin–operated video game with 3D polygon–based graphics (Steel Talons), 1991.

Ulrich, "Tactical Mapping in Combat Aircraft", IEEE 1988, pp. 74–78.

Raymen et al. "Advanced Terrain Data Processor", IEEE 1994, pp. 636–639.

Patrick et al., "Itars Robust Demonstration System Integration", IEEE 1988, pp. 83–87.

Jacobs et al., "Fractal Image Compression Using Iterated Transforms: Applications to DTED", IEEE 1994, pp. 1122–1128.

Polhemus, P.O. Box 560, Colchesier, VT, Sales brochure for 3D head tracker, Jan. 1994.

Atari Games Corp. 675 Sycamore Dr., Milpitas, GA 95035, Sales brochure for coin–operated video game with 3D, 1991.

Atari Game Corp, 675 Sycamore, Milpitas, CA 95035, Sales brochure for coin–operated video game with 3D polygon––based graphic (Hard Drivin) 1988.

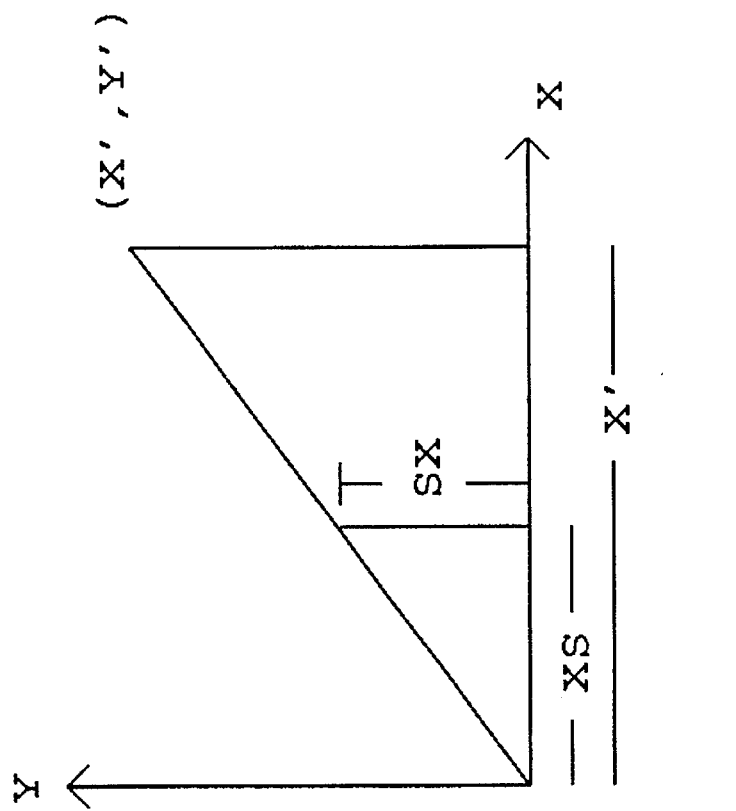
Fig. 7b Top
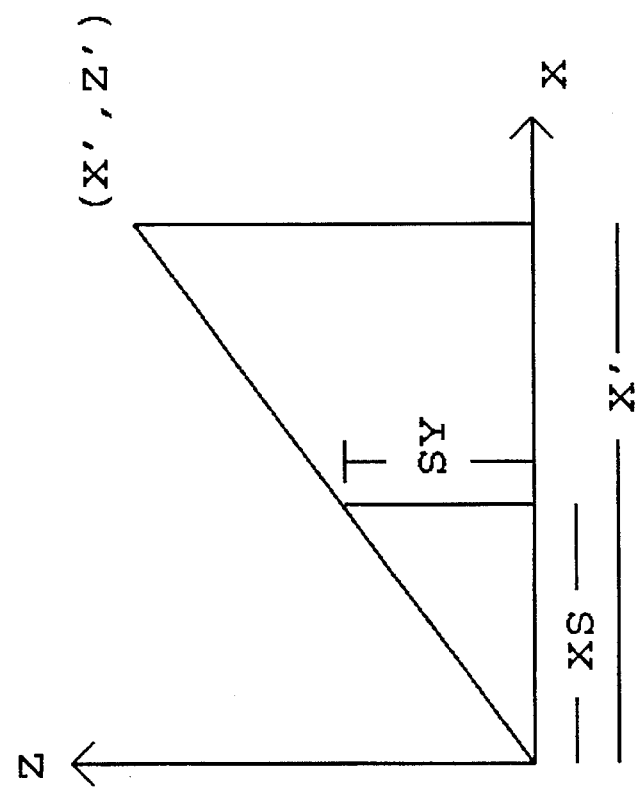
Fig. 7a Side

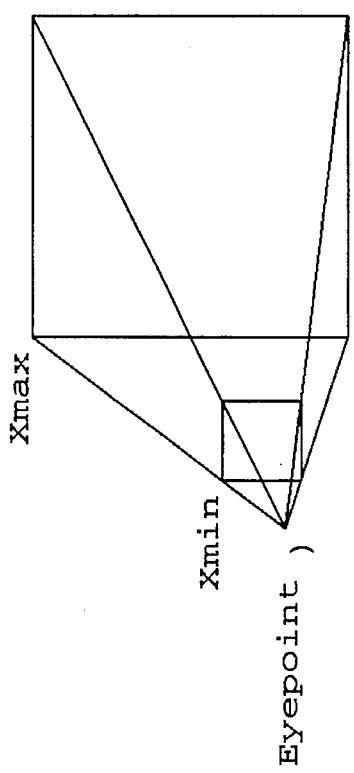
Fig. 8a
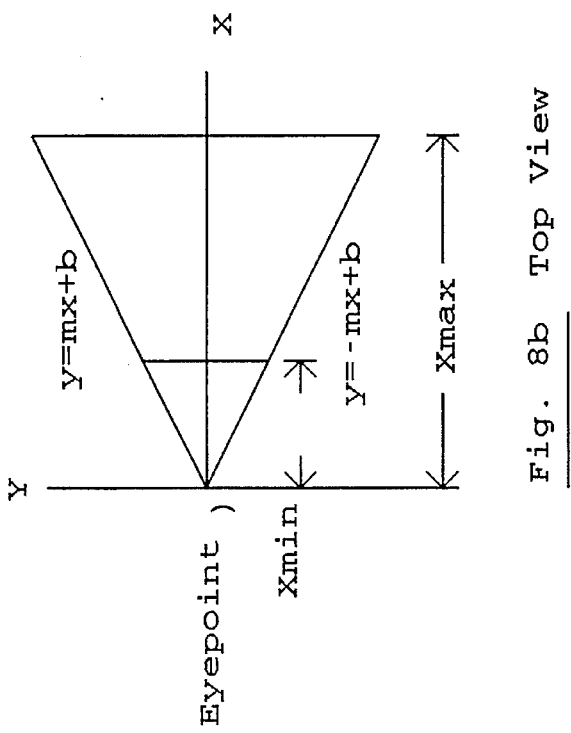
Fig. 8b  Top View
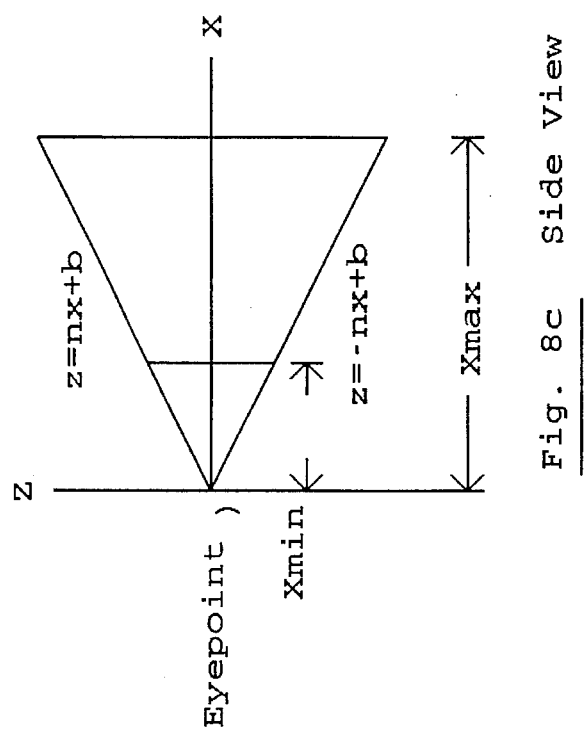
Fig. 8c  Side View

| 33 | 32 | 31 |
|---|---|---|
| 23 | 22 ← | 21 |
| 13 | 12 | 11 |

Fig. 10b

| 32 | 31 | 30 |
|---|---|---|
| 22 | 21 ← | 20 |
| 12 | 11 | 10 |

| 33 | 32 | 31 |
|---|---|---|
| 23 | 22 ↑ | 21 |
| 13 | 12 | 11 |

Fig. 11b

| 43 | 42 | 41 |
|---|---|---|
| 33 | 32 ↑ | 31 |
| 23 | 22 | 21 |

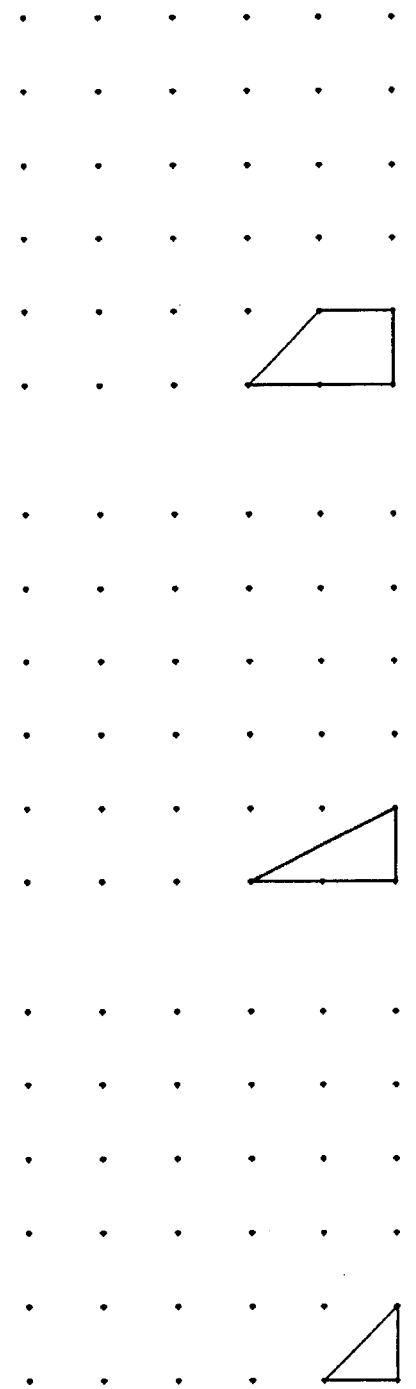
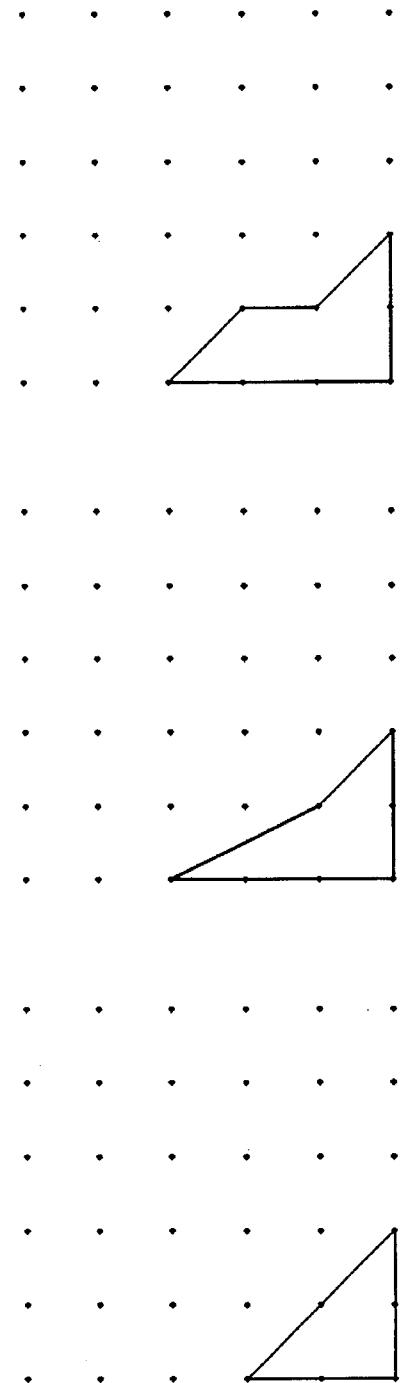
Fig. 12a Fig. 12b Fig. 12c Fig. 12d Fig. 12e Fig. 12f

PILOT AID USING A SYNTHETIC ENVIRONMENT

This is a continuation of application Ser. No. 08/274,394, filed Jul. 11, 1994, now abandoned.

BACKGROUND OF THE INVENTION

This invention relates to a pilot aid for synthesizing a view of the world. When flying under Visual Flight Rules (VFR) the normal procedure for determining your position is to relate what you see out the window to the information on a paper map. During the day it can be difficult to determine your location because the desired landmark can be lost in the clutter of everything else. When flying at night you see mostly lights. When flying under Instrument Flight Rules (IFR) you must relate the information from various navigation aids to the information on a printed map. You must then interpret the map information in order to avoid flying into objects such as mountains and the like. An improvement in this situation came about when the global positioning system (GPS) became operational and available for civilian use. GPS directly provides map coordinates but you must still, however, interpret the map information. Systems have been developed which use GPS coordinates to access an electronic map which is presented on a display as a flat map. Systems have also been developed that present an apparent three-dimensional effect and some that present a mathematically correct texture-mapped three-dimensional projected display.

Both of these systems require a very large amount of storage for terrain data. The latter system also requires specialized hardware. Their high cost have prevented their widespread adoption by the aviation community.

The 1984 patent to Taylor et al. (U.S. Pat. No. 4,445,118) shows the basic operation of the global positioning system (GPS).

The 1984 patent to Johnson et al. (U.S. Pat. No. 4,468,793) shows a receiver for receiving GPS signals.

The 1984 patent to Maher (U.S. Pat. No. 4,485,383) shows another receiver for receiving GPS signals.

The 1986 patent to Evans (U.S. Pat. No. 4,599,620) shows a method for determining the orientation of a moving object and producing roll, pitch, and yaw information.

The 1992 patent to Timothy et al. (U.S. Pat. No. 5,101,356) also shows a method for determining the orientation of a moving object and producing roll, pitch, and yaw information.

The 1993 patent to Ward et al. (U.S. Pat. No. 5,185,610) shows a method for determining the orientation of a moving object from a single GPS receiver and producing roll, pitch, and yaw information.

The 1992 patent to Fraughton et al. (U.S. Pat. No. 5,153,836) shows a navigation, surveillance, emergency location, and collision avoidance system and method whereby each craft determines its own position using LORAN or GPS and transmits it on a radio channel along with the craft's identification information. Each craft also receives the radio channel and thereby can determine the position and identification of other craft in the vicinity.

The 1992 patent to Beckwith et al. (U.S. Pat. No. 5,140,532) provides a topographical two-dimensional real-time display of the terrain over which the aircraft is passing, and a slope-shading technique incorporated into the system provides to the display an apparent three-dimensional effect similar to that provided by a relief map. This is accomplished by reading compressed terrain data from a cassette tape in a controlled manner based on the instantaneous geographical location of the aircraft as provided by the aircraft navigational computer system, reconstructing the compressed data by suitable processing and writing the reconstructed data into a scene memory with a north-up orientation. A read control circuit then controls the read-out of data from the scene memory with a heading-up orientation to provide a real-time display of the terrain over which the aircraft is passing. A symbol at the center of display position depicts the location of the aircraft with respect to the terrain, permitting the pilot to navigate the aircraft even under conditions of poor visibility. However, the display provided by this system is in the form of a moving map rather than a true perspective display of the terrain as it would appear to the pilot through the window of the aircraft.

The 1987 patent to Beckwith et al. (U.S. Pat. No. 4,660,157) is similar to U.S. Pat. No. 5,140,532. It also reads compressed terrain data from a cassette tape in a controlled manner based on the instantaneous geographical location of the aircraft as provided by the aircraft navigational computer system and reconstructs the compressed data by suitable processing and writing the reconstructed data into a scene memory. However, instead of providing a topographical two-dimensional display of the terrain over which the aircraft is passing and using a slope-shading technique to provide an apparent three-dimensional effect similar to that provided by a relief map as shown in the '532 patent, the '157 patent processes the data to provide a 3D perspective on the display. There are a number of differences between the '157 patent and the present invention:

1. The '157 Patent stores the map as a collection of terrain points with associated altitudes; the large amount of storage required by this approach requires that a tape be prepared for each mission. The present invention stores terrain data as a collection of polygons which results in a significant reduction of data base storage; larger geographic areas can be stored so that it it not necessary to generate a data base for each mission.

2. The '157 Patent uses a tape cassette for data base storage; the long access time for tape storage makes it necessary to use a relatively large cache memory. The present invention uses a CD-ROM which permits random access to the data so that the requirements for cache storage are reduced.

3. The '157 Patent accounts for the aircraft's heading by controlling the way the data is read out from the tape. Different heading angles result in the data being read from a different sequence of addresses. Since addresses exist only at discrete locations, the truncation of address locations causes an unavoidable change in the map shapes as the aircraft changes heading. The present invention stores terrain as polygons which are mathematically rotated as the aircraft changes attitude. The resolution is determined by number of bits used to represent the vertices of the polygons, not the number of storage addresses.

4. The '157 accounts for the roll attitude of the aircraft by mathematically rotating the screen data after it is projected. The '157 Patent does not show the display being responsive to the pitch angle of the aircraft. In systems such as this the lack of fidelity is apparent to the user. People know what things are supposed to look like and how they are supposed to change perspective when they move. The present invention uses techniques that have long been used by the computer graphics industry to perform the mathematically correct transformation and projection.

5. The '157 shows only a single cockpit display while one of the embodiments of the present invention shows a stereographic head-mounted display with a head sensor. The pilot is presented with a synthesized view of the world that is responsive to wherever the pilot looks; the view is not blocked by the cockpit or other aircraft structures. This embodiment is not anticipated by the '157 patent.

The 1991 patent to Behensky et al. (U.S. Pat. No. 5,005,148) shows a driving simulator for a video game. The road and other terrain are produced by mathematically transforming a three-dimensional polygon data base.

The first sales brochure from Atari Games Corp. is for a coin-operated game (Hard Drivin') produced in 1989 and relates to the '148 patent. The terrain is represented by polygons in a three-dimensional space. Each polygon is transformed mathematically according to the position and orientation of the player. After being tested to determine whether it is visible and having the appropriate illumination function performed, it is clipped and projected onto the display screen. These operations are in general use by the computer graphics industry and are well known to those possessing ordinary skill in the art.

The second sales brochure from Atari Games Corp. is for a coin-operated game (Steel Talons) produced in 1991 and which also relates to the '148 patent and the use of polygons to represent terrain and other objects.

The 1993 patent to Dawson et al. (U.S. Pat. No. 5,179,638) shows a a method and apparatus for providing a texture mapped perspective view for digital map systems which includes a geometry engine that receives the elevation posts scanned from the cache memory by the shape address generator. A tiling engine is then used to transform the elevation posts into three-dimensional polygons. There are a number of differences between the '638 patent and the present invention:

1. The '638 Patent is for a digital map system only. The matter of how the location and attitude are selected is not addressed. The present invention uses a digital map as part of a system for presenting an aircraft pilot with a synthesized view of the world regardless of the actual visibility.

2. The '638 Patent stores the map as a collection of terrain points with associated altitudes, thereby requiring a large amount of data storage. The terrain points are transformed into polygons during program run-time thereby adding to the processing burden. The present invention stores terrain data as a collection of polygons which results in a significant reduction of data base storage.

3. The present invention also teaches the use of a stereographic head-mounted display with a head sensor. The pilot is presented with a synthesized view of the world that is responsive to wherever the pilot looks; the view is not blocked by the cockpit or other aircraft structures. This embodiment is not anticipated by the '638 patent.

The 1994 patent to Hamilton et al. (U.S. Pat. No. 5,296,854) shows a helicopter virtual display system in which the structual outlines corresponding to structual members forming the canopy structure are added to the head-up display in order to replace the canopy structure clues used by pilots which would otherwise be lost by the use of the head-up display.

The 1994 patent to Lewins (U.S. Pat. No. 5,302,964) shows a head-up display for an aircraft and incorporates a cathode-ray tube image generator with a digital look-up table for distortion correction. An optical system projects an image formed on the CRT screen onto a holographic mirror combiner which is transparent to the pilot's direct view through the aircraft windshield.

The sales brochure from the Polhemus company shows the commercial availability of a position and orientation sensor which can be used on a head-mounted display.

The article from EDN magazine, Jan. 7, 1993, pages 31–42, entitled "System revolutionizes surveying and navigation" is an overview of how the global positioning system (GPS) works and lists several manufacturers of commercially available receivers. The article also mentions several applications such as the use by geologists to monitor fault lines, by oil companies for off-shore oil explorations, for keeping track of lower-orbit satellites, by fleet vehicle operators to keep track of their fleet, for crop sprayers to spread fertilizer and pesticides more efficiently, and for in-car systems to display maps for automotive navigation.

The section from "Aviator's Guide to GPS" presents a history of the GPS program.

The sales brochure from Megellan Systems Corp. is for commercially available equipment comprising a GPS receiver with a moving map display. The map that is displayed is a flat map.

The sales brochure from Trimble Navigation is for a commercially available GPS receiver.

The sales brochure from the U.S. Geological survey shows the availability of Digital Elevation Models for all of the United States and its territories.

The second sales brochure from the U.S. Geological survey shows the availability of Digital Line Graph Models for all of the United States and its territories. The data includes: political and administrative boundaries; hydrography consisting of all flowing water, standing water, and wetlands; major transportation systems consisting of roads and trails, railroads, pipelines, transmission lines, and airports; and significant manmade structures.

The Washington Sectional Aeronautical Chart is a paper map published by the U.S. Department of Commerce, National Oceanic and Atmospheric Administration that shows the complexity of the information that an aircraft pilot needs in order to fly in the area covered by the map. The other areas of the U.S. are covered by similar maps.

The sales brochure from Jeppesen Sanderson shows that the company makes its navigation data base available in computer readable form.

Accordingly, several objects and advantages of my invention are to provide a system that produces a mathematically correct three-dimensional projected view of the terrain while reducing the amount of storage required for the data base and which can be accomplished by using standard commercially available components. The invention can be used as a real-time inflight aid or it can be used to preview a flight, or it can be used to replay and review a previous flight.

Further objects and advantages of my invention will become apparant from a consideration of the drawings and ensuing description.

SUMMARY OF THE INVENTION

The present invention is a pilot aid which uses the aircraft's position and attitude to transform data from a digital data base to present a pilot with a synthesized three-dimensional projected view of the world. The three-dimensional position is typically determined by using the output of a commercially available GPS receiver. As a safety check, the altitude calculated by the GPS receiver can be compared to the output of either a standard altimeter or a radio altimeter. Attitude can also be determined from the use of a GPS receiver or it can be derived from standard avionic instruments such as turn-and-bank indicator and gyrocompass. The digital data base represents the terrain and manmade structures as collections of polygons in order to minimize storage requirements. The pilot can select several feature such as pan, tilt, and zoom which would allow the pilot to see a synthesized view of terrain that would otherwise be blocked by the aircraft's structure, especially on a low-wing aircraft. The pilot can also preview the route either inflight or on the ground. Because the system has the ability to save the flying parameters from a flight, the pilot can replay all or part of a previous flight, and can even take over during the replay to try out different flight strategies. Through the use of a head-mounted display with a head sensor, the pilot can have complete range of motion to receive a synthesized view of the world, completely unhindered by the aircraft structure.

DESCRIPTION OF THE DRAWINGS

FIG. 7a is a side view showing the projection of a point in three-dimensions projected onto a two-dimensional screen.

FIG. 7b is a top view showing the projection of a point in three-dimensions projected onto a two-dimensional screen.

FIG. 8a is a cabinet-projected three-dimensional representation of the viewing pyramid.

FIG. 8b is a 2D top view of the viewing pyramid.

FIG. 8c is a 2D side view of the viewing pyramid.

FIG. 10a shows the impending crossover from Geographic Data Block 21 to Geographic Data Block 22.

FIG. 10b shows the result of a crossover from Geographic Data Block 21 to Geographic Data Block 22.

FIG. 11a shows the impending crossover from Geographic Data Block 22 to Geographic Data Block 32.

FIG. 11b shows the result of a crossover from Geographic Data Block 22 to Geographic Data Block 32.

FIG. 12a through FIG. 12f, and FIG. 13a through FIG. 13f show the procedure for generating the polygon data base from the Digital Elevation Model data.

DETAILED SPECIFICATION

Figure 1:
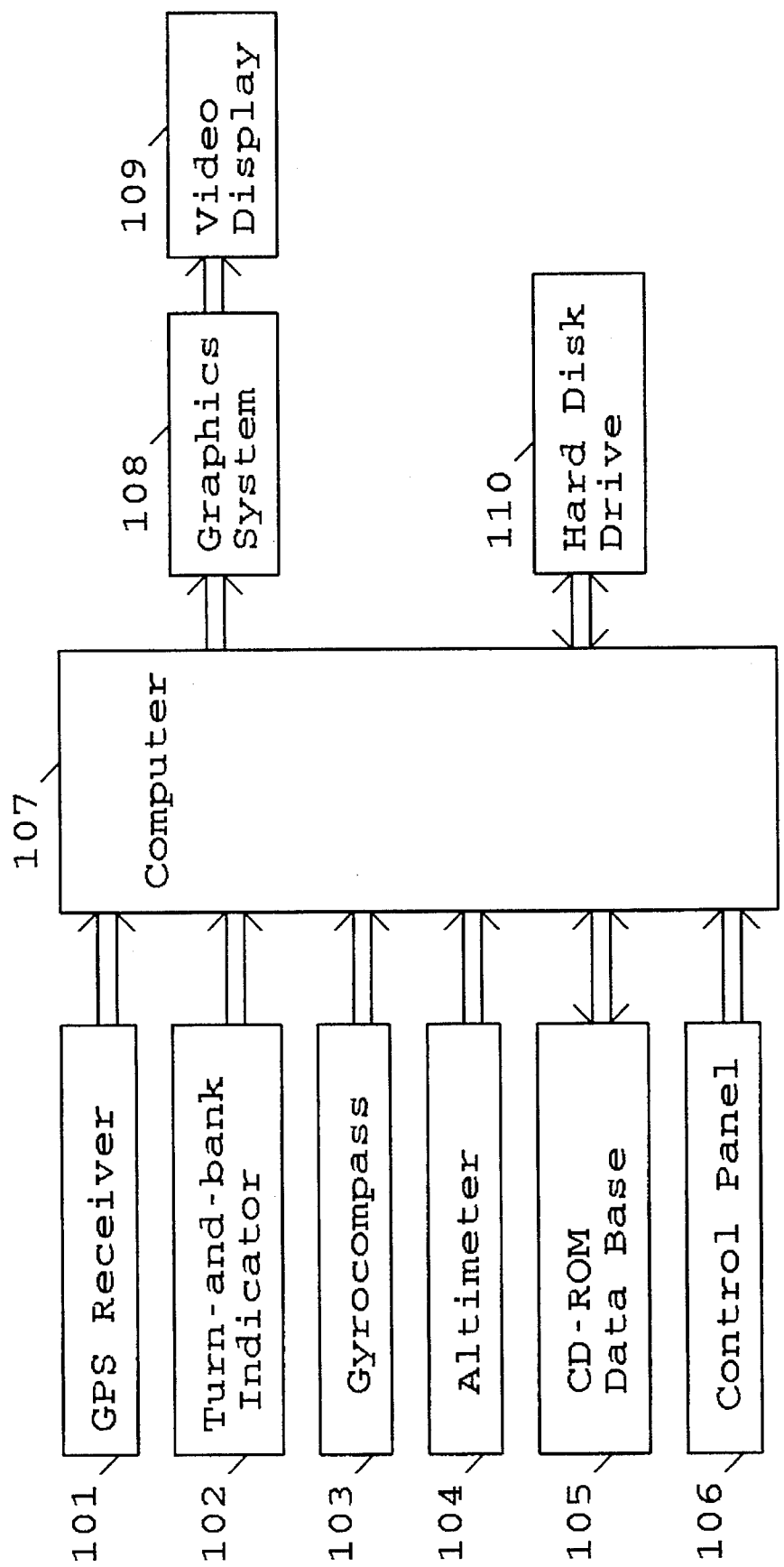
FIG. 1 is a block diagram showing the output to a single video display.

FIG. 1 shows the basic form of the invention. GPS Receiver 101 receives signals from the satellites that make up the global positioning system (GPS) and calculates the aircraft's position in three dimensions. Altimeter 104 provides an output of the aircraft's altitude as a safety check in the event GPS Receiver 101 malfunctions. Turn-and-bank Indicator 102 and Gyrocompass 103 provide the aircraft's attitude which comprises heading, roll, and pitch. CD-ROM Data Base 105 contains the digital data base consisting of three-dimensional polygon data for terrain and manmade structures.

Figure 4:
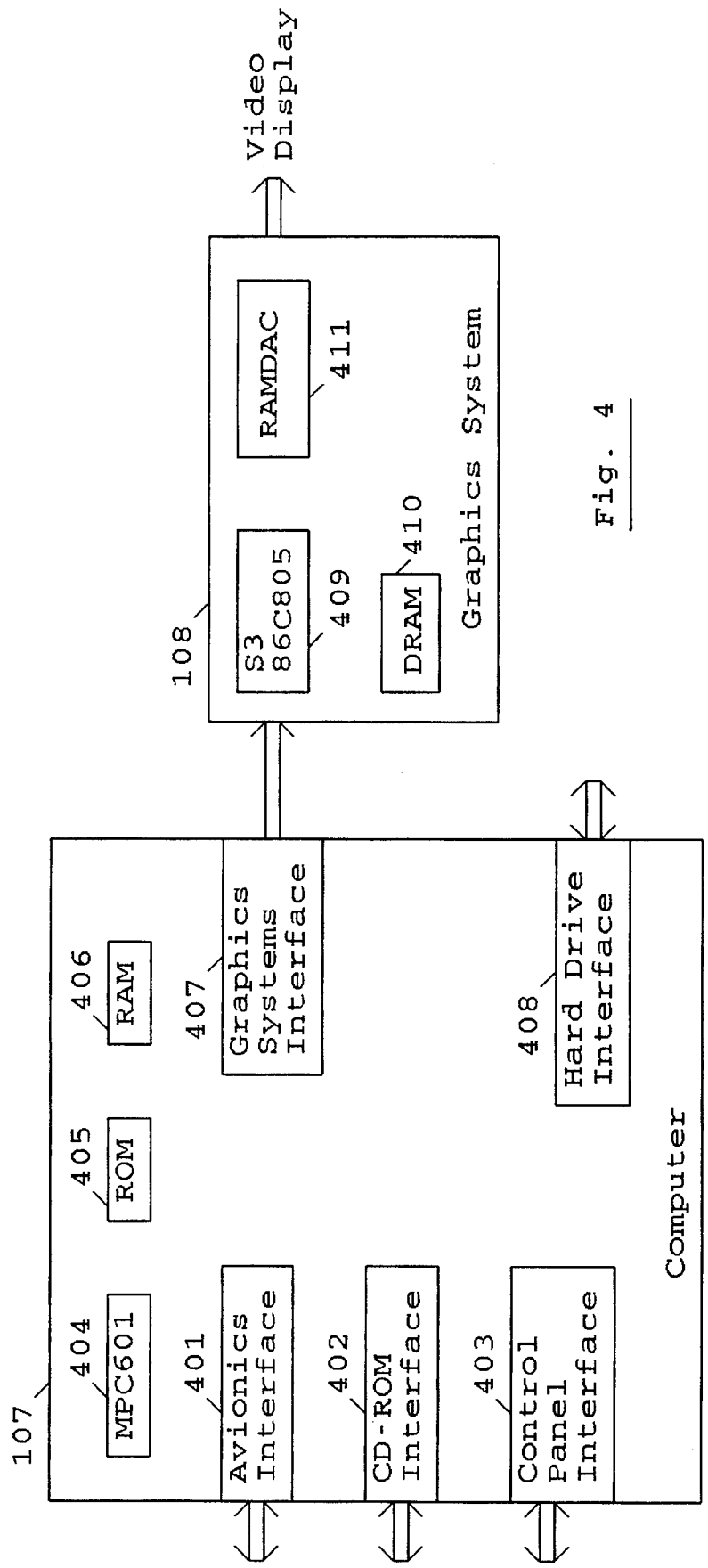
FIG. 4 is a block diagram showing Computer 107 and Graphics System 108 in FIG. 1, FIG. 2, and FIG. 3.

Computer 107 is shown in more detail in FIG. 4 and uses commercially available integrated circuits including processor 404, the MPC601, from Motorola Semiconductor Inc. The MPC601 is a fast 32-bit RISC processor with a floating point unit and a 32K Byte eight-way set-associative unified instruction and data cache. Most integer instructions are executed in one clock cycle. Compilers are available for ANSI standard C and for ANSI standard FORTRAN 77. Computer 107 also contains ROM 405, RAM 406, Avionics Interface 401, CD-ROM Interface 402, Control Panel Interface 403, Graphics Systems Interface 407, and Hard Drive Interface 408.

Computer 107 uses the aircraft's position from GPS Receiver 101 to look up the terrain and manmade structure data in CD-ROM Data Base 105. This data is organized in geographic blocks and is accessed so that there is always the proper data present. This is shown in FIG. 10a. FIG. 10b shows that when the aircraft crosses from Block 21 to Block 22, the data from Blocks 10, 20, and 30 are discarded and data from Blocks 13, 23, and 33 are brought in from CD-ROM Data Base 105. FIG. 11a and FIG. 11b show the aircraft crossing from Block 22 to Block 32.

Computer 107 uses the aircraft's position from GPS Receiver 101 and attitude information from Turn-and-bank Indicator 102 and Gyrocompass 103 to mathematically operate on the terrain and manmade structure data to present three-dimensional projected polygons to Graphics System 108. As shown in FIG. 4, Graphics System 108 consists of a commercially available graphics integrated circuit 409, the 86C805, made by S3 Incorporated. This integrated circuit contains primitives for drawing lines in addition to the standard SVGA graphics functions. The 86C805 controls DRAM 410 which is the video memory consisting of two buffers of 1024×768 pixels, each of which is 8 bits deep. The video to be displayed from DRAM 410 is sent to RAMDAC 411 which is an integrated circuit commercially available from several manufacturers, such as Brooktree and AT&T. RAMDAC 411 contains a small RAM of 256×24 bits and three 8-bit DACs. The RAM section is a color table programmed to assign the desired color to each of the 256 combinations possible by having 8 bits/pixel and is combined with three video DACs, one for each color for Video Display 109.

Video Display 109 is a color video display of conventional design such as a standard CRT, an LCD panel, or a plasma display panel. The preferred size of Video Display 109 is 19" although other sizes may be used.

Figure 2:
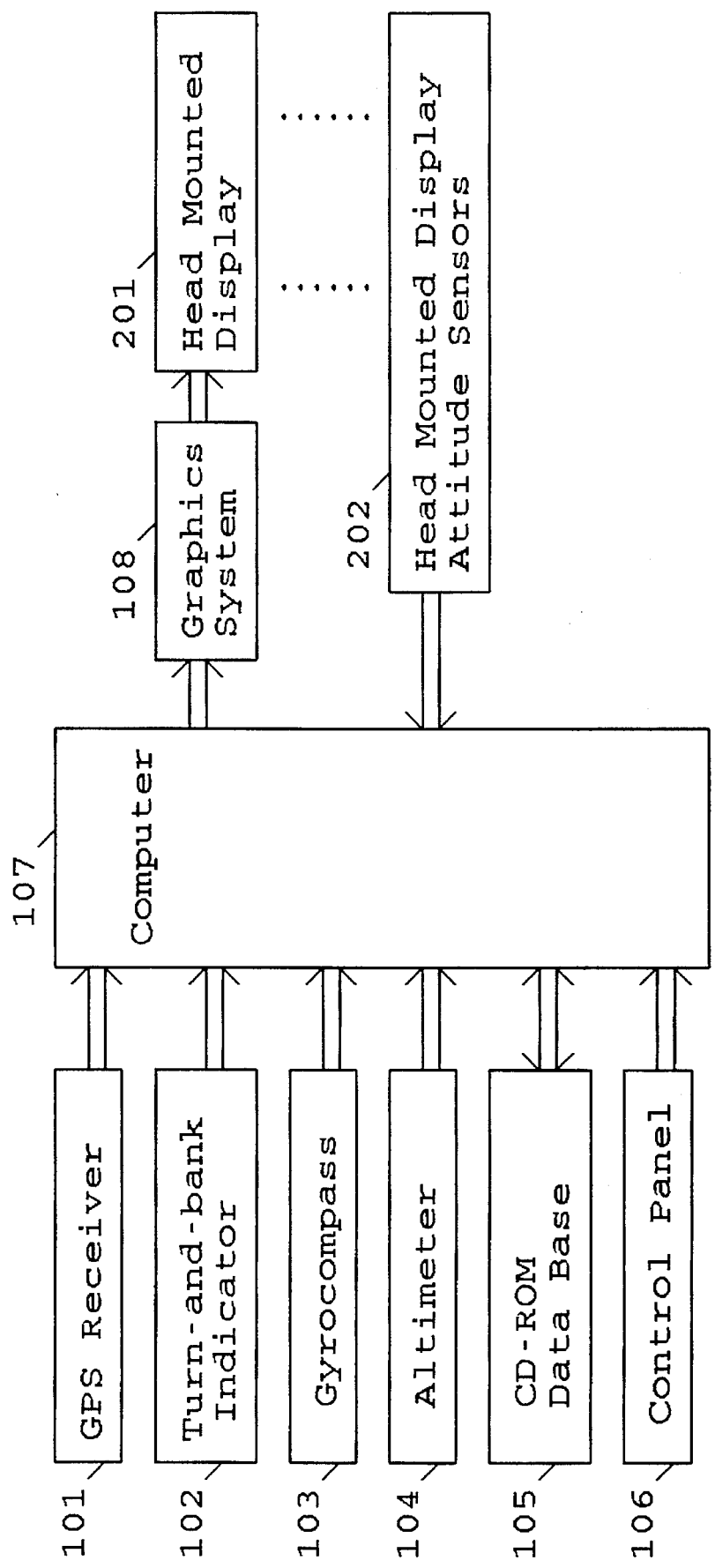
FIG. 2 is a block diagram showing the output to a head-mounted display.

FIG. 2 shows the use of the system with Head Mounted Display 201. Head Mounted Display Attitude Sensors 202 provide Computer 107 with the orientation of Head Mounted Display 201. This orientation is concatenated with the aircraft's orientation provided by Turn-and-bank Indicator 102 and Gyrocompass 103. As a consequence the pilot can turn his or her head and view the three-dimensional synthesized view of the transformed terrain and manmade structure data unhindered by the aircraft's structure. With the appropriate sensors for engines, fuel tanks, doors, and the like, the pilot can be presented with synthesized representations of these objects in their correct locations. For example, the pilot would be able to 'look' at a fuel tank and 'see' if it is running low. The pilot would also be able to 'see' if there is a problem with an engine and, on multi-engine aircraft, identify which one. By using a technique similar to that taught in the 1992 patent to Fraughton et al. (U.S. Pat. No. 5,153,836) where each aircraft determines its own position using LORAN or GPS and transmits it on a radio channel along with the aircraft's identification information so that each craft also receives the radio channel and can thereby determine the position and identification of other craft in the vicinity, these other aircraft can be presented in the present invention as three-dimensional objects in their correct positions to alert the pilot to their presence and take evasive maneuvers as required.

Hard Disk Drive 110 is for recording the aircraft's position and orientation data for later playback in order to review the flight. Because the information presented on Video Display 109 is a function of the aircraft's position and orientation data applied to the CD-ROM Data Base 105, it can be reconstructed later at any time by storing just the aircraft's position and orientation data and applying it again to CD-ROM Data Base 106, as long as the data base is still available. The aircraft's position and orientation data requires fewer than 100 bytes. By recording it every 0.1 seconds, an hour requires about 3.6 Megabytes of storage. (100 bytes/update×10 updates/second×60 seconds/min×60 minutes/hour=about 3.6 Megabytes) Therefore, a standard 340 Megabyte hard drive would store about 94 hours of operation.

Figure 3:
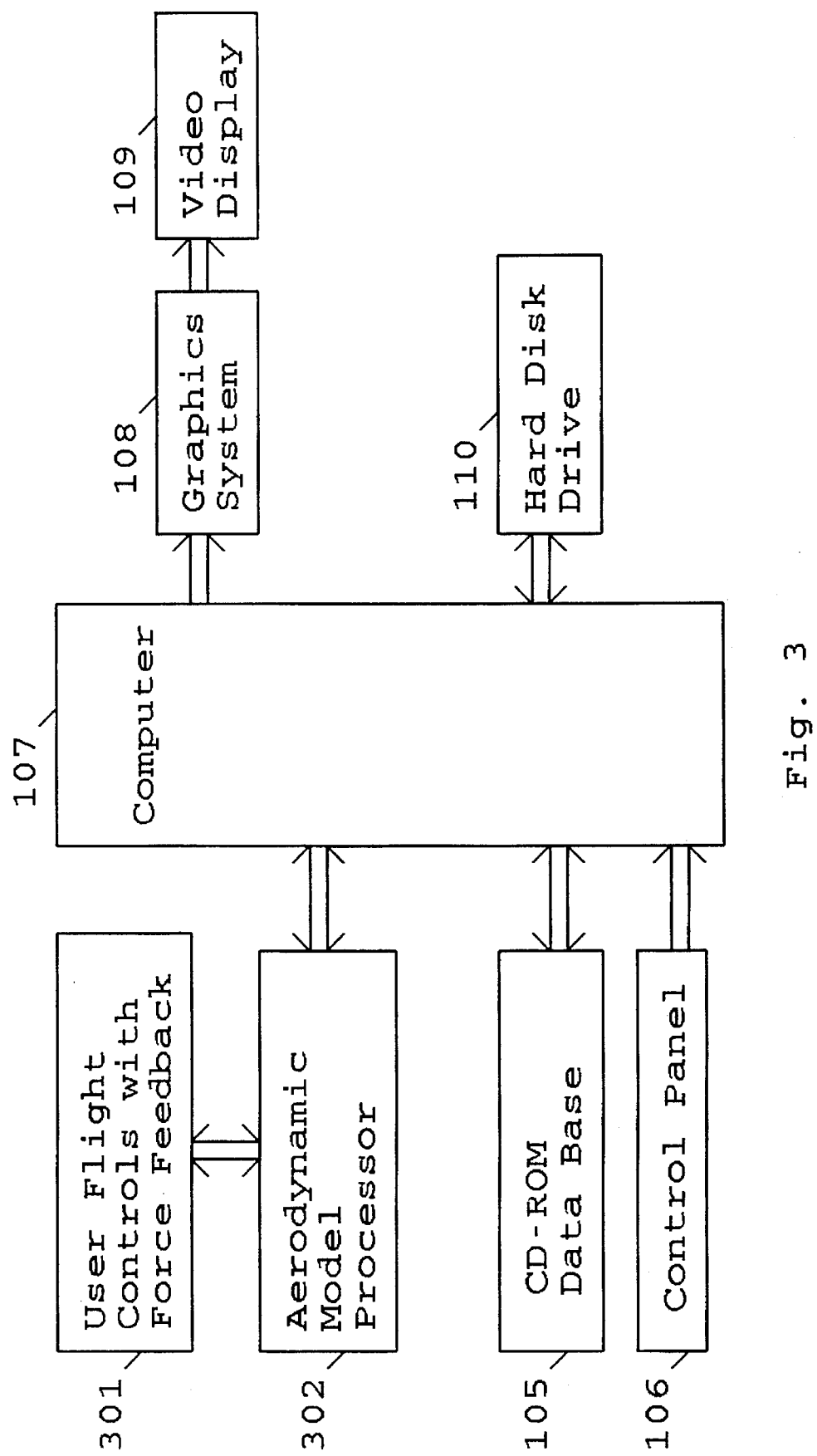
FIG. 3 is a block diagram showing a system used to plan and/or replay a particular flight.

A method for previewing a route that has not been flown before is shown in FIG. 3. GPS Receiver 101, Turn-and-bank Indicator 102, Gyrocompass 103, and Altimeter 104 are replaced by User Flight Controls with Force Feedback 301 and Aerodynamic Model Processor 302. Aerodynamic Model Processor 302 is a processor that implements the aerodynamic mathematical model for the type of aircraft desired. It receives the user inputs from User Flight Control with Force Feedback 301, performs the mathematical calculations to simulate the desired aircraft, and supplies output back to the Force Feedback part of the controls and to Computer 107. The outputs supplied to Computer 107 simulate the outputs normally supplied to GPS Receiver 101, Turn-and-bank Indicator 102, Gyrocompass 103, and Altimeter 104. In this way, Computer 107 executes exactly the same program that it would perform in the in-flight system. This permits the pilot to practice flying routes that he or she has not flown before and is particularly useful in practicing approach and landing at unfamiliar airports. This system does not need to be installed in an aircraft; it can be installed in any convenient location, even the pilot's home.

Control Panel 106 allows the pilot to select different operating features. For example, the pilot can choose the 'look angle' of the display (pan and tilt). This would allow the pilot to see synthesized terrain coresponding to real terrain that would otherwise be blocked by the aircraft's structure like the nose, or the wing on a low wing aircraft. Another feature is the zoom function which provides magnification. Another feature is to permit the pilot to select a section of the route other than the one he or she is on, for example, to preview the approach to the destination airport.

MATH INTRO

The math for the present invention has been used in the field of coin-operated video games and in traditional computer graphics. However, since it has not been well documented, it will be presented here. The basic concept assumes the unit is a simulator, responsive to the user's inputs. It is a short step from that to the present invention where the inputs represent the physical location and attitude of the aircraft.

The steps required to view a 3D polygon-based data base are:

1. Transformation (translation and rotation as required)
2. Visibility and illumination
3. Clipping
4. Projection In this geometric model there is an absolute Universe filled with Objects, each of which is free to rotate and translate. Associated with each Object is an Orthonormal Matrix (i.e. a set of Orthogonal Unit Vectors) that decribes the Object's orientation with respect to the Universe. Because the Unit Vectors are Orthogonal, the Inverse of the matrix is simply the Transpose. This makes it very easy to change the point of reference. The Object may look at the Universe or the Universe may look at the Object. The Object may look at another Object after the appropriate concatenation of Unit Vectors. Each Object will always Roll, Pitch, or Yaw around its own axes regardless of its current orientation without using Euler angle functions.

ROTATIONS

The convention used here is that the Z axis is straight up, the X axis is straight ahead, and the Y axis is to the right. ROLL is a rotation around the X axis, PITCH is a rotation around the Y axis, and YAW is a rotation around the Z axis.

For a simple positive (counter-clockwise) rotation of a point around the origin of a 2-Dimensional space:

$X'=X*COS(a)-Y*SIN(a)$ $Y'=X*SIN(a)+Y*COS(a)$

Figure 5B:
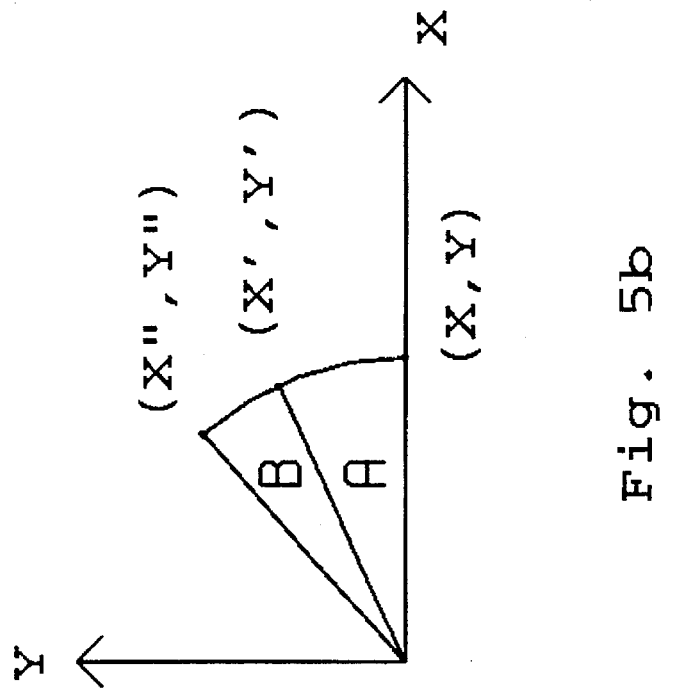
FIG. 5b shows a second positive (counter-clockwise) rotation of a point around the origin of a 2-Dimensional space.
Figure 5A:
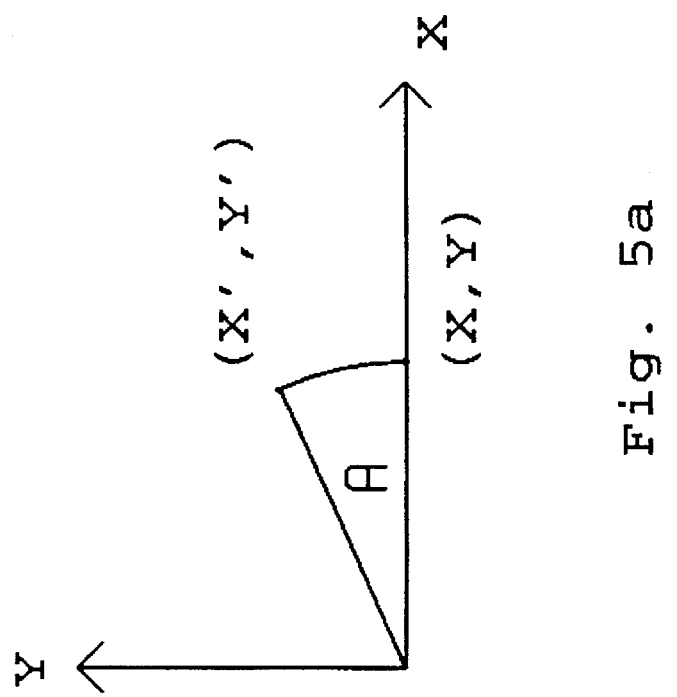
FIG. 5a shows a simple positive (counter-clockwise) rotation of a point around the origin of a 2-Dimensional space.

See FIG. 5a.

If we want to rotate the point again there are two choices:

1. Simply sum the angles and rotate the original points, in which case:

$X''=X*COS(a+b)-Y*SIN(a+b)$ $Y''=X*SIN(a+b)+Y*COS(a+b)$

2. Rotate X', Y' by angle b:

$X''=X'*COS(b)-Y'*SIN(b)$ $Y''=X'*SIN(b)+Y'*COS(b)$

See FIG. 5b.

With the second method the errors are cumulative. The first method preserves the accuracy of the original coordinates; unfortunately it works only for rotations around a single axis. When a series of rotations are done together around two or three axes, the order of rotation makes a difference. As an example: An airplane always Rolls, Pitches, and Yaws according to its own axes. Visualize an airplane suspended in air, wings straight and level, nose pointed North. Roll 90 degrees clockwise, then pitch 90 degrees "up". The nose will be pointing East. Now we will start over and reverse the order of rotation. Start from straight and level, pointing North. Pitch up 90 degrees, then Roll 90 degrees clockwise, The nose will now be pointing straight up, where "up" is referenced to the ground. If you have trouble visualizing these motions, Just pretend your hand is the airplane.

This means that we cannot simply keep a running sum of the angles for each axis. The standard method is to use functions of Euler angles. The method to be described is easier and faster to use than Euler angle functions.

Figure 6C:
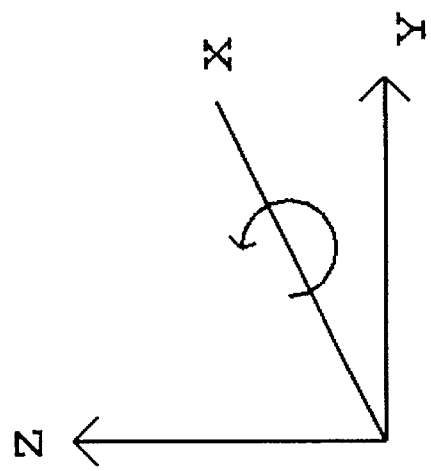
FIG. 6c is a re-orientation of the axes of FIG. 6a showing rotation around the X axis.

Although FIG. 5a represents a two dimensional space, it is equivalent to a three dimensional space where the rotation is around the Z axis. See FIG. 6a. The equations are:

$$X' = X*COS(za) - Y*SIN(za)$$
$$Y' = X*SIN(za) + Y*COS(za)$$
Equation 1

By symmetry the other equations are:

$$Z' = Z*COS(ya) - X*SIN(ya)$$
$$X' = Z*SIN(ya) + X*COS(ya)$$
Equation 2

Figure 6B:
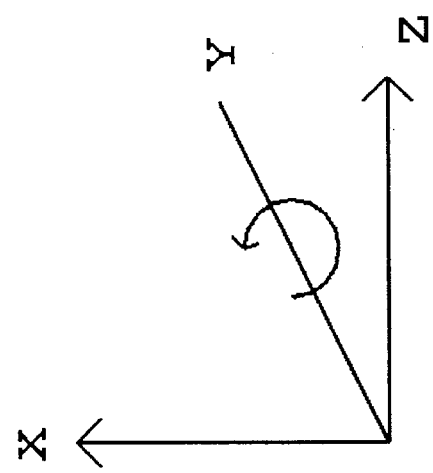
FIG. 6b is a re-orientation of the axes of FIG. 6a showing rotation around the Y axis.
Figure 6A:
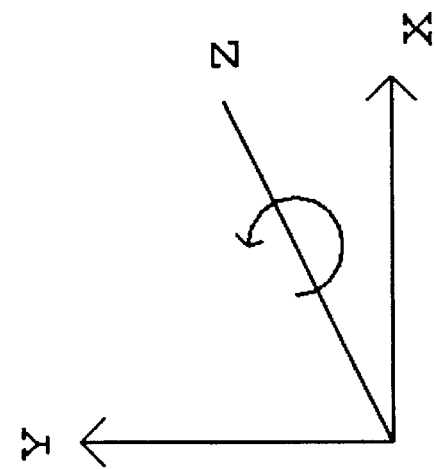
FIG. 6a shows the equivalent three dimensional space of FIG. 5a where the rotation is around the Z axis.
Figure 9B:
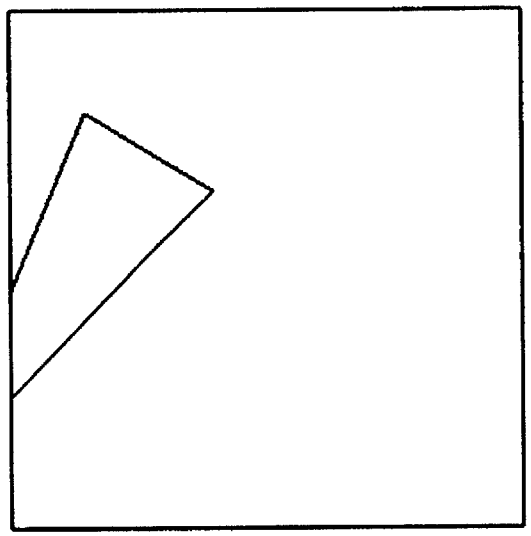
FIG. 9b shows how clipping the polygon in FIG. 9a produces additional sides to the polygon.
Figure 9A:
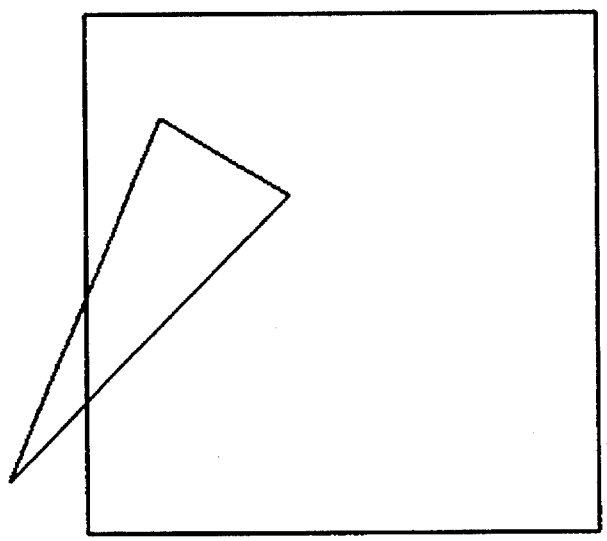
FIG. 9a shows an unclipped polygon.
Figure 13A:
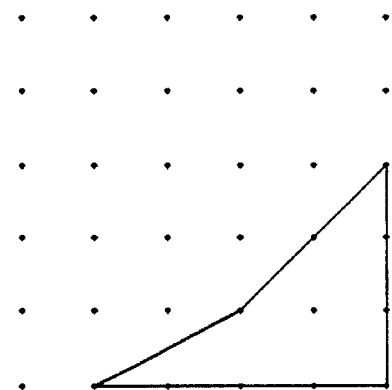
Figure 13B:
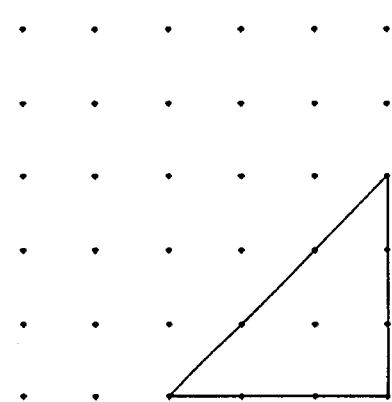
Figure 13C:
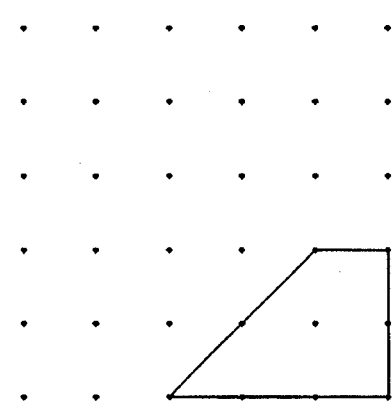
Figure 13D:
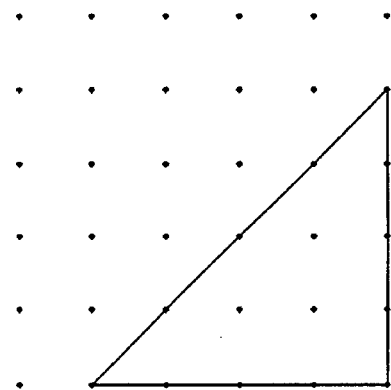
Figure 13E:
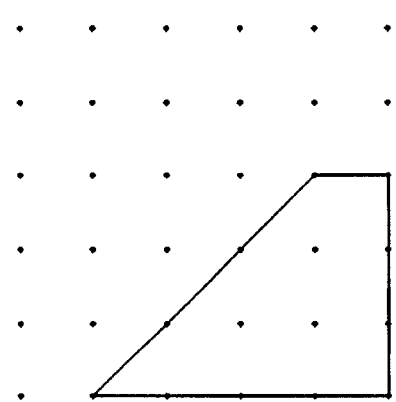
Figure 13F:
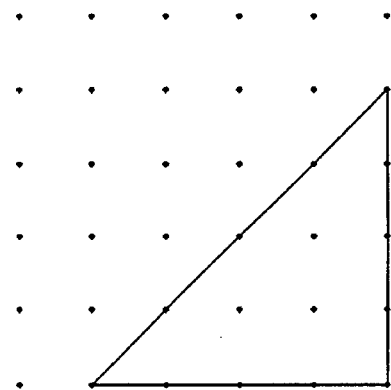

See FIG. 6b.
and
$$Y' = Y*COS(xa) - Z*SIN(xa)$$
$$Z' = Y*SIN(xa) + Z*COS(xa)$$
Equation 3

See FIG. 6c.

From the ship's frame of reference it is at rest; it is the Universe that is rotating. We can either change the equations to make the angles negative or decide that positive rotations are clockwise. Therefore, from now on all positive rotations are clockwise.

Consolidating Equations 1, 2, and 3 for a motion consisting of rotations za (around the Z axis), ya (around the Y axis), and xa (around the X axis) yields:

X'=X*[COS(ya)*COS(za)]+Y*[−COS(ya)*SIN(za)]+Z*[SIN(ya)]

Y'=X*[SIN(xa)*SIN(ya)*COS(za)+COS(xa)*SIN(za)]+ Y*[−SIN(xa)*SIN(ya)*SIN(za)+COS(xa)*COS(za)]+ Z*[−SIN(xa)*COS(ya)]

Z'=X*[−COS(xa)*SIN(ya)*COS(za)+SIN(xa)*SIN(za)] +Y*[COS(xa)*SIN(ya)*SIN(za)+SIN(xa)*COS(za)]+ Z*[COS(xa)*COS(ya)]

(The asymmetry in the equations is another indication of the difference the order of rotation makes.)

The main use of the consolidated equations is to show that any rotation will be in the form:

$$X'=Ax*X+Bx*Y+Cx*Z$$

$$Y'=Ay*X+By*Y+Cy*Z$$

$$Z'=Az*X+Bz*Y+Cz*Z$$

If we start with three specific points in the initial, absolute coordinate system, such as:

Px=(1,0,0)
Py=(0,1,0)
Pz=(0,0,1)
after any number of arbitrary rotations,
Px'=(XA,YA,ZA)
Py'=(XB,YB,ZB)
Pz'=(XC,YC,ZC)

By inspection:

| | | |
|---|---|---|
| XA = Ax | XB = Bx | XC = Cx |
| YA = Ay | YB = By | YC = Cy |
| ZA = Az | ZB = Bz | ZC = Cz |

Therefore, these three points in the ship's frame of reference provide the coefficients to transform the absolute coordinates of whatever is in the Universe of points. The absolute list of points is itself never changed so it is never lost and errors are not cumulative. All that is required is to calculate Px, Py, and Pz with sufficient accuracy. Px, Py, and Pz can be thought of as the axes of a gyrocompass or 3-axis stabilized platform in the ship that is always oriented in the original, absolute coordinate system.

TRANSLATIONS

Translations do not affect any of the angles and therefore do not affect the rotation coefficients. Translations will be handled as follows:

Rather than keep track of where the origin of the absolute coordinate system is from the ship's point of view (it changes with the ship's orientation), the ship's location will be kept track of in the absolute coordinate system.

To do this requires finding the inverse transformation of the rotation matrix. Px, Py, and Pz are vectors, each with a length of 1.000, and each one orthogonal to the others. (Rotating them will not change these properties.) The inverse of an orthonormal matrix (one composed of orthogonal unit vectors like Px, Py, and Pz) is formed by transposing rows and columns.

Therefore, for X, Y, Z in the Universe's reference and X', Y', Z' in the Ship's reference:

$$\begin{bmatrix} X' \\ Y' \\ Z' \end{bmatrix} = \begin{bmatrix} Ax & Bx & Cx \\ Ay & By & Cy \\ Az & Bz & Cz \end{bmatrix} * \begin{bmatrix} X \\ Y \\ Z \end{bmatrix} \text{ and}$$

$$\begin{bmatrix} X \\ Y \\ Z \end{bmatrix} = \begin{bmatrix} Ax & Ay & Az \\ Bx & By & Bz \\ Cx & Cy & Cz \end{bmatrix} * \begin{bmatrix} X' \\ Y' \\ Z' \end{bmatrix}$$

The ship's X unit vector (1,0,0), the vector which, according to the ship is straight ahead, transforms to (Ax,Bx,Cx). Thus the position of the ship in terms of the Universe's coordinates can be determined. The complete transformation for the Ship to look at the Universe, taking into account the position of the Ship: For X,Y,Z in Universe reference and X', Y', Z' in Ship's reference $$\begin{bmatrix} X' \\ Y' \\ Z' \end{bmatrix} = \begin{bmatrix} Ax & Bx & Cx \\ Ay & By & Cy \\ Az & Bz & Cz \end{bmatrix} * \begin{bmatrix} X - XT \\ Y - YT \\ Z - ZT \end{bmatrix}$$

INDEPENDENT OBJECTS

To draw objects in a polygon-based system, rotating the vertices that define the polygon will rotate the polygon.

The object will be defined in its own coordinate system (the object "library") and have associated with it a set of unit vectors. The object is rotated by rotating its unit vectors. The object will also have a position in the absolute Universe.

When we want to look at an object from any frame of reference we will transform each point in the object's library by applying a rotation matrix to place the object in the proper orientation. We will then apply a translation vector to place the object in the proper position. The rotation matrix is derived from both the object's and the observer's unit vectors; the translation vector is derived from the object's position, the observer's position, and the observer's unit vectors.

The simplest frame of reference from which to view an object is in the Universe's reference at (0,0,0) looking along the X axis. The reason is that we already have the rotation coeficients to look at the object. The object's unit vectors supply the matrix coefficients for the object to look at (rotate) the Universe. The inverse of this matrix will allow the Universe to look at (rotate) the object. As discussed previously, the unit vectors form an Orthonormal matrix; its inverse is simply the Transpose. After the object is rotated, it is translated to its position (its position according to the Universe) and projected. More on projection later.

A consequence of using the Unit Vector method is that, whatever orientation the object is in, it will always Roll, Pitch, and Yaw according to ITS axes.

For an object with unit vectors:

$$\begin{bmatrix} Ax & Bx & Cx \\ Ay & By & Cy \\ Az & Bz & Cz \end{bmatrix}$$

and absolute position [XT,YT,ZT], and [X,Y,Z] a point from the object's library, and [X',Y',Z'] in the Universe's reference, The Universe looks at the object:

$$\begin{bmatrix} X' \\ Y' \\ Z' \end{bmatrix} = \begin{bmatrix} Ax & Ay & Az \\ Bx & By & Bz \\ Cx & Cy & Cz \end{bmatrix} * \begin{bmatrix} X \\ Y \\ Z \end{bmatrix} + \begin{bmatrix} XT \\ YT \\ ZT \end{bmatrix}$$

For two ships, each with unit vectors and positions:

$$\begin{bmatrix} Ax1 & Bx1 & Cx1 \\ Ay1 & By1 & Cy1 \\ Az1 & Bz1 & Cz1 \end{bmatrix} \text{Ship 1 Unit Vectors}$$

(XT1,YT1,ZT1) Ship 1 Position $$\begin{bmatrix} Ax2 & Bx2 & Cx2 \\ Ay2 & By2 & Cy2 \\ Az2 & Bz2 & Cz2 \end{bmatrix} \text{Ship 2 Unit Vectors}$$

(XT2,YT2,ZT2) Ship 2 Position $$\begin{bmatrix} Ax2 & Ay2 & Az2 \\ Bx2 & By2 & Bz2 \\ Cx2 & Cy2 & Cz2 \end{bmatrix} \text{Transpose (Inverse) of Ship 2 Unit Vectors}$$

(X,Y,Z) in Ship 2 library, (X',Y',Z') in Universe Reference, and (X",Y",Z") in Ship 1 Reference Universe looks at ship 2:

$$\begin{bmatrix} X' \\ Y' \\ Z' \end{bmatrix} = \begin{bmatrix} Ax2 & Ay2 & Az2 \\ Bx2 & By2 & Bz2 \\ Cx2 & Cy2 & Cz2 \end{bmatrix} * \begin{bmatrix} X \\ Y \\ Z \end{bmatrix} + \begin{bmatrix} XT2 \\ YT2 \\ ZT2 \end{bmatrix}$$

Ship 1 looks at the Universe looking at Ship 2:

$$\begin{bmatrix} X" \\ Y" \\ Z" \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} X' - XT1 \\ Y' - YT1 \\ Z' - ZT1 \end{bmatrix} \quad \text{EQUATION 10}$$

$$= \begin{bmatrix} Ax1 & Bx1 & Cx1 \\ Ay1 & By1 & Cy1 \\ Az1 & Bz1 & Cz1 \end{bmatrix} * \begin{bmatrix} X' \\ Y' \\ Z' \end{bmatrix} - \begin{bmatrix} Ax1 & Bx1 & Cx1 \\ Ay1 & By1 & Cy1 \\ Az1 & Bz1 & Cz1 \end{bmatrix} * \begin{bmatrix} XT1 \\ YT1 \\ ZT1 \end{bmatrix}$$

Expand:

$$\begin{bmatrix} Ax1 & Bx1 & Cx1 \\ Ay1 & By1 & Cy1 \\ Az1 & Bz1 & Cz1 \end{bmatrix} * \begin{bmatrix} X' \\ Y' \\ Z' \end{bmatrix} = \begin{bmatrix} Ax1 & Bx1 & Cx1 \\ Ay1 & By1 & Cy1 \\ Az1 & Bz1 & Cz1 \end{bmatrix} *$$

$$\left( \begin{bmatrix} Ax2 & Bx2 & Cx2 \\ Ay2 & By2 & Cy2 \\ Az2 & Bz2 & Cz2 \end{bmatrix} * \begin{bmatrix} X \\ Y \\ Z \end{bmatrix} + \begin{bmatrix} XT2 \\ YT2 \\ ZT2 \end{bmatrix} \right)$$

Using the Distributive Law of Matrices:

$$= \begin{bmatrix} Ax1 & Bx1 & Cx1 \\ Ay1 & By1 & Cy1 \\ Az1 & Bz1 & Cz1 \end{bmatrix} * \left( \begin{bmatrix} Ax2 & Ay2 & Az2 \\ Bx2 & By2 & Bz2 \\ Cx2 & Cy2 & Cz2 \end{bmatrix} * \begin{bmatrix} X \\ Y \\ Z \end{bmatrix} \right) +$$

$$\begin{bmatrix} Ax1 & Bx1 & Cx1 \\ Ay1 & By1 & Cy1 \\ Az1 & Bz1 & Cz1 \end{bmatrix} * \begin{bmatrix} XT2 \\ YT2 \\ ZT2 \end{bmatrix}$$

Using the Associative Law of Matrices:

$$= \left( \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix} \right) * \begin{bmatrix} X \\ Y \\ Z \end{bmatrix} +$$

$$\begin{bmatrix} Ax1 & Bx1 & Cx1 \\ Ay1 & By1 & Cy1 \\ Az1 & Bz1 & Cz1 \end{bmatrix} * \begin{bmatrix} XT2 \\ YT2 \\ ZT2 \end{bmatrix}$$

Substituting back into Equation 10 gives:

$$\begin{bmatrix} X" \\ Y" \\ Z" \end{bmatrix} = \left( \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix} \right) * \begin{bmatrix} X \\ Y \\ Z \end{bmatrix} +$$

$$\begin{bmatrix} Ax1 & Bx1 & Cx1 \\ Ay1 & By1 & Cy1 \\ Az1 & Bz1 & Cz1 \end{bmatrix} * \begin{bmatrix} XT2 \\ YT2 \\ ZT2 \end{bmatrix} - \begin{bmatrix} Ax1 & Bx1 & Cx1 \\ Ay1 & By1 & Cy1 \\ Az1 & Bz1 & Cz1 \end{bmatrix} * \begin{bmatrix} XT1 \\ YT1 \\ ZT1 \end{bmatrix}$$

Therefore:

$$\begin{bmatrix} X'' \\ Y'' \\ Z'' \end{bmatrix} = \left( \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix} \right) * \begin{bmatrix} X \\ Y \\ Z \end{bmatrix} + \begin{bmatrix} Ax1 & Bx1 & Cx1 \\ Ay1 & By1 & Cy1 \\ Az1 & Bz1 & Cz1 \end{bmatrix} * \begin{bmatrix} XT2 - XT1 \\ YT2 - YT1 \\ ZT2 - ZT1 \end{bmatrix} \quad \text{EQUATION 11}$$

Now let:

$$\begin{bmatrix} Ax & Bx & Cx \\ Ay & By & Cy \\ Az & Bz & Cz \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Bx2 & Cx2 \\ Ay2 & By2 & Cy2 \\ Az2 & Bz2 & Cz2 \end{bmatrix} \quad \text{EQUATION 12}$$

This matrix represents the orientation of Ship 2 according to Ship 1's frame of reference. This concatentation needs to be done only once per update of Ship 2.
Also let:

$$\begin{bmatrix} XT \\ YT \\ ZT \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} XT2 - XT1 \\ YT2 - YT1 \\ ZT2 - ZT1) \end{bmatrix} \quad \text{EQUATION 13}$$

(XT,YT,ZT) is merely the position of Ship 2 in Ship 1's frame of reference.

This also needs to be done only once per update of Ship 2. Therefore the transformation to be applied to Ship 2's library will be of the form:

$$\begin{bmatrix} X'' \\ Y'' \\ Z'' \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} X \\ Y \\ Z \end{bmatrix} + \begin{bmatrix} XT \\ YT \\ ZT \end{bmatrix} \quad \text{EQUATION 14}$$

Therefore, every object has six degrees of freedom, and any object may look at any other object.

SUMMARY OF TRANSFORMATION ALGORITHMS:
Define Unit Vectors:   $[Px] = (Ax, Ay, Az)$
  $[Py] = (Bx, By, Bz)$
  $[Pz] = (Cx, Cy, Cz)$
Initialize:   $Ax = By = Cz = 1.000$
  $Ay = Az = Bx = Bz = Cx = Cy = 0$
If Roll:
  $Ay' = Ay * COS(xa) - Az * SIN(xa)$
  $Az' = Ay * SIN(xa) + Az * COS(xa)$
  $By' = By * COS(xa) - Bz * SIN(xa)$
  $Bz' = By * SIN(xa) + Bz * COS(xa)$
  $Cy' = Cy * COS(xa) - Cz * SIN(xa)$
  $Cz' = Cy * SIN(xa) + Cz * COS(xa)$
If Pitch:
  $Az' = Az * COS(ya) - Ax * SIN(ya)$
  $Ax' = Az * SIN(ya) + Ax * COS(ya)$
  $Bz' = Bz * COS(ya) - Bx * SIN(ya)$
  $Bx' = Bz * SIN(ya) + Bx * COS(ya)$
  $Cz' = Cz * COS(ya) - Cx * SIN(ya)$
  $Cx' = Cz * SIN(ya) + Cx * COS(ya)$
If Yaw:
  $Ax' = Ax * COS(za) - Ay * SIN(za)$
  $Ay' = Ax * SIN(za) + Ay * COS(za)$
  $Bx' = Bx * COS(za) - By * SIN(za)$
  $By' = Bx * SIN(za) + By * COS(za)$
  $Cx' = Cx * COS(za) - Cy * SIN(za)$
  $Cy' = Cx * SIN(xa) + Cy * COS(xa)$ -continued
SUMMARY OF TRANSFORMATION ALGORITHMS:

('za', 'ya', and 'xa' are incremental rotations.)

The resultant unit vectors form a transformation matrix. For X, Y, Z in Universe reference and X', Y', Z' in Ship's reference $$\begin{bmatrix} X' \\ Y' \\ Z' \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} X \\ Y \\ Z \end{bmatrix}$$

and $$\begin{bmatrix} X \\ Y \\ Z \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} X' \\ Y' \\ Z' \end{bmatrix}$$

The ship's x unit vector, the vector which according to the ship is straight ahead, transforms to (Ax,Bx,Cx). For a ship in free space, this is the acceleration vector when there is forward thrust. The sum of the accelerations determine the velocity vector and the sum of the velocity vectors determine the position vector (XT,YT,ZT). For two ships, each with unit vectors and positions:

$$\begin{bmatrix} Ax1 & Bx1 & Cx1 \\ Ay1 & By1 & Cy1 \\ Az1 & Bz1 & Cz1 \end{bmatrix} \quad \text{Ship 1 Unit Vectors}$$

(XT1,YT1,ZT1)   Ship 1 Position $$\begin{bmatrix} Ax1 & Bx1 & Cx1 \\ Ay1 & By1 & Cy1 \\ Az1 & Bz1 & Cz1 \end{bmatrix} \quad \text{Ship 2 Unit Vectors}$$

(XT2,YT2,ZT2)   Ship 2 Position

Ship 1 looks at the Universe:

$$\begin{bmatrix} X' \\ Y' \\ Z' \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} X - XT \\ Y - YT \\ Z - ZT \end{bmatrix}$$

(X,Y,Z) in Universe
(X',Y',Z') in Ship 1 frame of reference

Ship 1 looks at Ship 2:

$$\begin{bmatrix} Ax & Bx & Cx \\ Ay & By & Cy \\ Az & Bz & Cz \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Bx2 & Cx2 \\ Ay2 & By2 & Cy2 \\ Az2 & Bz2 & Cz2 \end{bmatrix}$$

(Ship 2 orientation relative to Ship 1 orientation)

$$\begin{bmatrix} XT \\ YT \\ ZT \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} XT2 - XT1 \\ YT2 - YT1 \\ ZT2 - ZT1 \end{bmatrix}$$

(Ship 2 position in Ship 1's frame of reference)

$$\begin{bmatrix} X' \\ Y' \\ Z' \end{bmatrix} = \begin{bmatrix} Ax & Bx & Cx \\ Ay & By & Cy \\ Az & Bz & Cz \end{bmatrix} * \begin{bmatrix} X \\ Y \\ Z \end{bmatrix} + \begin{bmatrix} XT \\ YT \\ ZT \end{bmatrix}$$

(X,Y,Z) in Ship 2 library
(X',Y',Z') in Ship 1 reference

VISIBILITY AND ILLUMINATION

After a polygon is transformed, whether it is a terrain polygon or it belongs to an independently moving object such as another aircraft, the next step is to determine its illumination value, if indeed, it is visible at all.

Associated with each polygon is a vector of length 1 that is normal to the surface of the polygon. This is obtained by using the vector crossproduct between the vectors forming any two adjacent sides of the polygon. For two vectors V1=[x1,y1,z1] and V2=[x2,y2,z2] the crossproduct V1×V2 is the vector [(y1*z2−y2*z1),−(x1*z2−x2*z1),(x1*y2−x2*y1)]. The vector is then normalized by dividing it by its length. This gives it a length of 1. This calculation can be done when the data base is generated, becoming part of the data base, or it can be done during program run time. The tradeoff is between data base size and program execution time. In any event, it becomes part of the transformed data.

After the polygon and its normal are transformed to the aircraft's frame of reference, we need to calculate the angle between the polygon's normal and the vector from the base of the normal to the aircraft. This is done by taking the vector dot product. For two vectors V1=[x1,y1,z1] and V2=[x2,y2,z2], V1 dot V2=length(V1)*length(V2)*cos(a) and is calulated as (x1*x2+y1*y2+z1*z2). Therefore:

$$\cos(a) = \frac{(x1 * x2 + y1 * y2 + z1 * z2)}{\text{length}(V1) * \text{length}(V2)}$$

A cosine that is negative means that the angle is between 90 degress and 270 degrees. Since this angle is facing away from the observer it will not be visible and can be rejected and not subjected to further processing. The actual cosine value can be used to determine the brightness of the polygon for added realism.

CLIPPING

Now that the polygon has been transformed and checked for visibility it must be clipped so that it will properly fit on the screen after it is projected. Standard clipping routines are well known in the computer graphics industry. There are six clipping planes as shown in the 3D representation shown in FIG. 8a. The 2D top view is shown in FIG. 8b, and the 2D side view is shown in FIG. 8c. It should be noted that clipping a polygon may result in the creation of addition polygon sides which must be added to the polygon description sent to the polygon display routine.

PROJECTION

As shown in FIG. 7a, X' is the distance to the point along the X axis, Z' is the height of the point, Xs is the distance from the eyepoint to the screen onto which the point is to be projected, and Sy is the vertical displacement on the screen. Z'/X' and Sy/Xs form similar triangles so: Z'/X'=Sy/Xs, therefore Sy=Xs*Z'/X'. Likewise, Y'/X'=Sx/Xs so Sx=Xs*Y'/X' where Sx is the horizontal displacement on the screen. However, we still need to fit Sy and Sx to the monitor display coordinates. Suppose we have a screen that is 1024 by 1024. Each axis would be plus or minus 512 with (0,0) in the center. If we want a 90 degree field of view (plus or minus 45 degrees from the center), then when a point has Z'/X'=1 it must be put at the edge of the screen where its value is 512. Therefore Sy=512*Z'/X'. (Sy is the Screen Y-coordinate). Therefore:

Sy=K*Z'/X' Sy is the vertical coordinate on the display

Sx=K*Y'/X' Sx is the horizontal coordinate on the display

K is chosen to make the viewing angle fit the monitor coordinates. If K is varied dynamically we end up with a zoom lens effect. And if we are clever in implementing the divider, K can be performed without having to actually do a multiplication.

THE DATABASE

The data base is generated from several sources. The U.S. Geological Survey (USGS) makes available various databases, two of which are of particular interest. The first is the Digital Elevation Model data which consist of an array of regularly spaced terrain elevations. This data base is converted into a data base containing polygons (whose vertices are three-dimensional points) in order to maximize the geographic area covered by CD-ROM Data Base 105 and also to reduce the amount of run-time processing required of Computer 107. This is possible because there are large areas of terrain that are essentially flat. Note that flat does not necessarily mean level. A sloping area is flat without being level.

The Digital Elevation Model data elevations are spaced 30 meters apart. 30 meters=30m×39.37 in/m×1 ft/12 in=98.245 ft. A linear mile contains 5,280 ft/mi×1 data point/98.245 ft=53.65 data points/mi. Therefore, a square mile contains 53.65×53.65=2878 data points. California has a total area of 158,706 square miles which requires 158,706×2878=456,755,868 data points. Since this figure includes 2,407 sq mi of inland water areas, there are 2407×2878=6,927,346 data points just for inland water. The U.S. has a total area of 3,618,773 square miles which requires 3,618,773×2878=10,414,828,694 data points. This figure includes 79,484 sq mi of inland water areas requiring 79,484×2878=228,754,952 data points just for inland water.

The polygon data are organized in geographic data blocks. Because the amount of data in each geographic data block depends on the number of polygons and because the number of polygons depends on the flatness of the terrain, the size of each geographic data block is variable. Therefore, an address table is maintained that contains a pointer to each geographic data block. The first choice is to decide on the geographic area represented by the block. For the present invention the size is 20 mi×20 mi=400 sq mi. Therefore, the polygon data base for California requires 158,706 sq mi×1 block/400 sq mi=397 geographic data blocks. The number of polygons in a given geographic data block depends on the flatness of the terrain and what we decide is 'flat'. The definition of 'flatness' is that for a polygon whose vertices are three-dimensional points, there will be no elevation points that are higher than the plane of the polygon and there will be no elevation points that are below the the plane of the polygon by a distance called the Error Factor. A small Error Factor will require more polygons to represent a given terrain than will a large Error Factor. A small Error Factor will also generate the terrain more accurately. The Error Factor does not have to be the same for all Geographic Data Blocks. Blocks for areas of high interest, like airports and surrounding areas can be generated using a small Error Factor in order to represent the terrain more precisely. The present invention uses an Error Factor of 10 ft for areas surrounding airports and 50 ft for all other areas.

A procedure for generating the polygon data base from the Digital Elevation Model data is demonstrated in FIG. 12a through FIG. 12f and FIG. 13a through FIG. 13f. We start with three points which define a polygon and which has a surface. We select the next elevation point and decide if it belongs in the polygon according to the citeria previously discussed. If it does, it gets added to the polygon. If not, not. We then test additional adjacent points until we run out. Then we start over with another three points.

When we are done generating polygons for a Geographic Data Block we go back and examine them; any polygon that is 'too big' is broken down into smaller polygons. This is to make sure there are always enough polygons on the screen to provide a proper reference for the pilot. (A single large polygon on the screen would not have any apparent motion.) Finally, the polygons are assigned colors and/or shades so that adjacent polygons will not blend into each other.

The other USGS data base used is the Digital Line Graph data which includes: political and administrative boundaries; hydrography consisting of all flowing water, standing water, and wetlands; major transportation systems consisting of roads and trails, railroads, pipelines, transmission lines, and airports; and significant manmade structures. The Digital Line Graph data is two-dimensional. In the present invention features such as water, roads, railroads, and pipelines are represented as polygons with elevations determined from the Digital Elevation Model data. Transmission lines and significant manmade structures are defined as three-dimensional objects made of polygons and are placed according to the elevations determined from the Digital Elevation Model data. The different types of objects are tagged so that by using Control Panel 106 the pilot can select them to be highlighted by category or by specific object. For example, the pilot can choose to have all airports highlighted or just the destination airport. The pilot can also choose to have a specific highway highlighted.

Data from additional digital data bases can also be incorporated. An example of such a data base is from Jeppesen Sanderson whose NavData Services division provides aeronautical charts and makes this information available in digital form.

While preferred embodiments of the present invention have been shown, it is to be expressly understood that modifications and changes may be made thereto and that the present invention is set forth in the following claims.

I claim:

1. A pilot aid which uses an aircraft's position and attitude to transform data from a digital data base to present a pilot with a synthesized three dimensional projected view of the world comprising:

a position determining system for locating said aircraft's position in three dimensions;

a digital data base comprising terrain data, said terrain data representing real terrestrial terrain as at least one polygon, said terrain data generated from elevation data of said real terrestrial terrain;

an attitude determining system for determining said aircraft's orientation in three dimensional space;

a computer to access said terrain data according to said aircraft's position and to transform said terrain data to provide three dimensional projected image data according to said aircraft's orientation; and a display for displaying said three dimensional projected image data.

2. The pilot aid of claim 1, wherein said position determining system comprises a standard system for receiving and processing data from the global positioning system.

3. The pilot aid of claim 1, wherein said attitude determining system comprises a standard avionics system.

4. The pilot aid of claim 1, wherein said digital data base comprises a cd rom disc and cd rom drive.

5. The pilot aid of claim 1, further comprising a control panel to select at least one operating feature.

6. The pilot aid of claim 5, wherein said at least one operating feature comprises at least one feature selected from a group consisting of panning a viewpoint of said three dimensional projected image, tilting a viewpoint of said three dimensional projected image, zooming a viewpoint of said three dimensional projected image, and providing a three dimensional projected image of a route ahead.

7. The pilot aid as described in claim 1 wherein said digital data base further comprises structure data, said structure data representing manmade structures as one or more polygons.

8. The pilot aid as described in claim 1 wherein said elevation data comprises an array of elevation points, wherein each said polygon representing said terrain defines a plane, wherein in a first region of terrain represented by said at least one polygon each elevation point within each said polygon is within a first distance of said plane of each said polygon.

9. The pilot aid as described in claim 8 wherein in a second region of said terrain represented by said at least one polygon each elevation point within each said polygon is within a second distance of said plane of each said polygon in said second region, said second distance different from said first distance.

10. The pilot aid as described in claim 9 wherein no elevation point within each said polygon in said first region and said second region is above said plane of said polygon.

11. The pilot aid as described in claim 8 wherein no elevation point within each said polygon in said first region is above said plane of said polygon.

12. A pilot aid which uses an aircraft's position and attitude to transform data from a digital data base to present a pilot with a synthesized three dimensional projected view of the world comprising:

a position determining system for locating said aircraft's position in three dimensions;

a digital data base comprising terrain data, said terrain data representing real terrestrial terrain as at least one polygon, said terrain data generated from elevation data of said real terrestrial terrain;

an attitude determining system for determining said aircraft's orientation in three dimensional space;

a computer to access said terrain data according to said aircraft's position and to transform said terrain data to provide three dimensional projected image data according to said aircraft's orientation; and a mass storage memory for recording said aircraft position data and said aircraft's attitude data for allowing a flight of said aircraft over said terrain to be displayed at a later time.

13. The pilot aid of claim 12, wherein said position determining system comprises a standard system for receiving and processing data from the global positioning system.

14. The pilot aid of claim 12, wherein said attitude determining systems comprises a standard avionics system.

15. The pilot aid of claim 12, wherein said digital data base comprises a cd rom and a cd rom drive.

16. The pilot aid of claim 12, further comprising a control panel to select at least one operating feature.

17. The pilot aid of claim 16, wherein said at least one operating feature comprises at least one feature selected from a group consisting of panning a viewpoint of said three dimensional projected image, tilting a viewpoint of said three dimensional projected image, zooming a viewpoint of said three dimensional projected image, providing a three dimensional projected image of a route ahead, and providing a three dimensional projected image of a previous flight.

18. The pilot aid as described in claim 12 wherein said digital data base further comprises structure data, said structure data representing manmade structures as one or more polygons.

19. The pilot aid as described in claim 12 wherein said elevation data comprises an array of elevation points, wherein each said polygon representing said terrain defines a plane, wherein in a first region of terrain represented by said at least one polygon each elevation point within each said polygon is within a first distance of said plane of each said polygon.

20. The pilot aid as described in claim 19 wherein in a second region of said terrain represented by said at least one polygon each elevation point within each said polygon is within a second distance of said plane of each said polygon in said second region, said second distance different from said first distance.

21. The pilot aid as described in claim 20 wherein no elevation point within each said polygon in said first region and said second region is above said plane of said polygon.

22. The pilot aid as described in claim 19 wherein no elevation point within each said polygon in said first region is above said plane of said polygon.

23. A pilot aid which uses an aircraft's position and attitude to transform data from a digital data base to present a pilot with a synthesized three dimensional projected view of the world comprising:

a position determining system for locating said aircraft's position in three dimensions;

a digital data base comprising terrain data, said terrain data representing real terrestrial terrain as at least one polygon, said terrain data generated from elevation data of said real terrestrial terrain;

a first attitude determining system for determining said aircraft's orientation in three dimensional space;

a head mounted display worn by said pilot of said aircraft;

a second attitude determining system for determining the orientation of said pilot's head in three dimensional space; and a computer to access said terrain data according to said aircraft's position and to transform said terrain data to provide three dimensional projected image data to said head mounted display according to said aircraft's orientation and said pilot head orientation.

24. The pilot aid as described in claim 23 wherein said digital data base further comprises structure data, said structure data representing manmade structures as one or more polygons.

25. The pilot aid as described in claim 23 wherein said elevation data comprises an array of elevation points, wherein each said polygon representing said terrain defines a plane, wherein in a first region of terrain represented by said at least one polygon each elevation point within each said polygon is within a first distance of said plane of each said polygon.

26. The pilot aid as described in claim 25 wherein in a second region of said terrain represented by said at least one polygon each elevation point within each said polygon is within a second distance of said plane of each said polygon in said second region, said second distance different from said first distance.

27. The pilot aid as described in claim 26 wherein no elevation point within each said polygon in said first region and said second region is above said plane of said polygon.

28. The pilot aid as described in claim 25 wherein no elevation point within each said polygon in said first region is above said plane of said polygon.

29. A method of using an aircraft's position and attitude to transform data from a digital data base to present a pilot with a synthesized three dimensional projected view of the world comprising:

locating said aircraft's position in three dimensions;

providing a data base comprising terrain data, said terrain data representing real terrestrial terrain as at least one polygons, said terrain data generated from elevation data of said real terrestrial terrain;

determining said aircraft's orientation in three dimensional space;

accessing said terrain data according to said aircraft's position;

transforming said terrain data to provide three dimensional projected image data according to said aircraft's orientation; and displaying said three dimensional projected image data.

30. The method of claim 29 further comprising selecting at least one operating feature, wherein said at least one operating feature comprises at least one feature selected from a group consisting of panning a viewpoint of said three dimensional projected image, tilting a viewpoint of said three dimensional projected image, zooming a viewpoint of said three dimensional projected image, and presenting a three dimensional projected image of a route ahead.

31. The method as described in claim 29 wherein said terrain data base is produced by a method comprising the steps of:

providing a plurality of elevation points, each of said plurality of elevation points representing an elevation of a point on a terrain;

defining a polygon having at least one vertex defined by at least one of said elevation points;

examining an adjacent one of said plurality of elevation points to determine if expanding said polygon to an expanded polygon to include said adjacent one of said plurality of elevation points causes at least one of said plurality of elevation points within said expanded polygon not to be within a first distance of a plane of said expanded polygon; and expanding said polygon to include said adjacent one of said plurality of elevation points if each of said elevation points within said expanded polygon is within said first distance of said plane.

32. The method as described in claim 31 wherein at least one additional adjacent one of said plurality of elevation points is examined, and wherein said polygon is expanded to include said at least one additional one of said plurality of elevation points that does not cause any of said elevation points within said expanded polygon not to be within said first distance of said plane of said expanded polygon.

33. The method as described in claim 32 wherein said polygon is stored in said terrain data base after all of said elevation points adjacent to said polygon have been examined.

34. The method as described in claim 32 wherein additional polygons are defined, expanded, and added to said terrain database.

35. The method as described in claim 31 wherein at least one additional adjacent one of said plurality of elevation points is examined, and wherein said polygon is expanded to include said at least one additional one of said plurality of elevation points that does not cause any of said elevation points within said expanded polygon to be above said plane of said expanded polygon and does not cause any of said elevation points within said expanded polygon not to be within said first distance of said plane of said expanded polygon.

36. The method as described in claim 35 wherein said polygon is stored in said terrain data base after all of said elevation points adjacent to said polygon have been examined.

37. The method as described in claim 31 wherein said adjacent one of said plurality of elevation points is further examined to determine if at least one of said plurality of elevation points within said expanded polygon is above said plane of said expanded polygon, and said polygon is expanded if none of said elevation points within said expanded polygon is above said plane of said expanded polygon and if each of said elevation points within said expanded polygon is within said first distance of said plane.

* * * * *